May 14, 1940.   E. H. SCHULTZ, JR   2,200,245
PRESSED METAL SHEAVE

Filed March 24, 1939

Inventor
E. H. Schultz, Jr.
by
Attorney

Patented May 14, 1940

2,200,245

UNITED STATES PATENT OFFICE 2,200,245

PRESSED METAL SHEAVE

Edward H. Schultz, Jr., Chicago, Ill., assignor to Allis-Chalmers Manufacturing Company, Milwaukee, Wis., a corporation of Delaware Application March 24, 1939, Serial No. 263,826

13 Claims. (Cl. 74—230.8)

This invention pertains to a pressed metal sheave, particularly a sheave designed for use in multiple V-belt drives.

It is an object of this invention to provide a more rigid construction by means of improved interlocking means between the plates composing a sheet metal sheave and the spacing rings thereof.

It is a further object of the invention to provide improved driving means between a collection of plates and spacing rings on one hand, and a supporting hub on the other.

In the drawing illustrating preferred embodiments of this invention:

Figure 1:
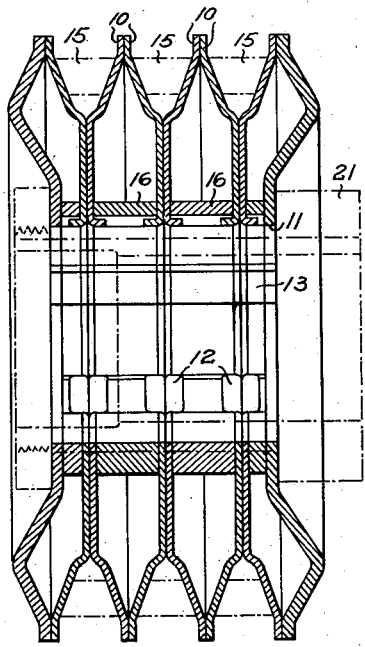
Fig. 1 is a cross-sectional view of a partial sheave assembly in accordance with this invention, showing the interengagement between the pressed metal plates and spacing rings comprising the sheave, the hub being shown in dot-and-dash lines.
Figure 2:
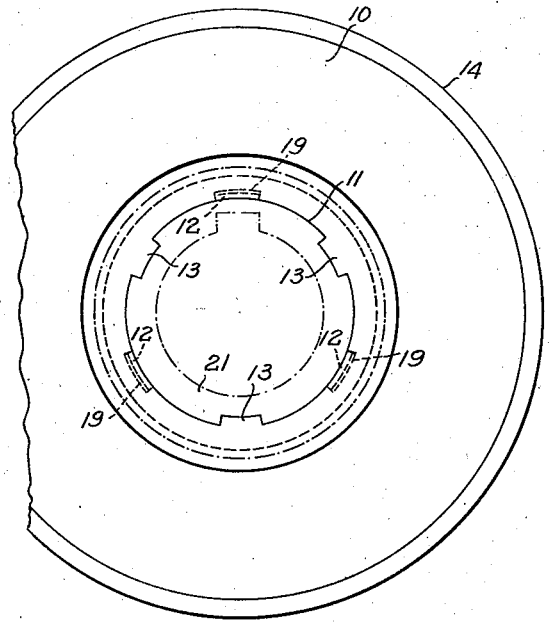
Fig. 2 is an end view of the sheave.
Figure 3:
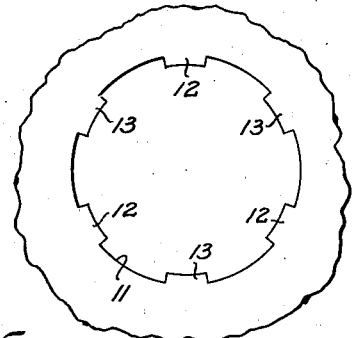
Fig. 3 is an elevation, fragmentary view of a plate of the sheave prior to assembly.
Figure 4:
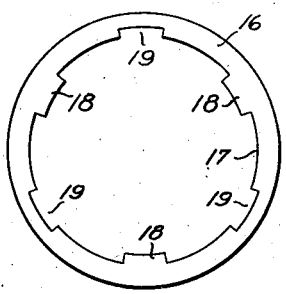
Fig. 4 is an elevation view of one of the spacing rings.
Figure 5:
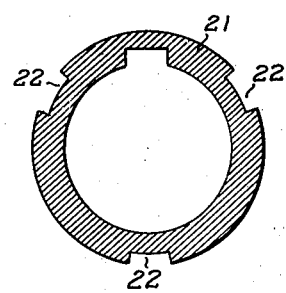
Fig. 5 is a cross-sectional view of a hub for supporting the collection of pressed metal plates and spacing rings.

Referring to the drawing in detail, the sheave comprises a plurality of disks 10 placed alternately face to face and back to back to provide V-grooves for a plurality of V-belts 15, adjacent plates being welded together at their mutually contacting portions, including the peripheries 14. Each of the groove-forming plates, as shown in Fig. 3, is provided with a central aperture 11 for receiving a hub, and a plurality of tongues 12 and 13 extending inward from the inner perimeter of each plate into said aperture. Located between adjacent pairs of plates 10 are spacing rings 16, which are provided with a plurality of tongues 18 alined with the tongues 13 of plates 10. Spacing rings 16 are also provided with axial grooves 19, which are in alinement with tongues 12 of disks 10. When the spacing rings 16 are located in position between adjacent pairs of disks 10, the tongues 12 of each plate are deflected into grooves 19 of adjacent rings 16, as clearly shown in Fig. 1, thereby rigidly interlocking plates 10 and disks 16 against relative rotation.

The assembly of disks 10 and spacing rings 16 forms a self-supporting unitary structure, which may be mounted on freely removable hub 21. The hub is provided with grooves 22, which receive the alined plate tongues 13 and spacing ring tongues 18.

It will be understood that the resulting construction provides for transmission of the torque between hub 21 and belts 15. Assuming that this is a driving sheave, the torque from the hub is transmitted through the walls of grooves 22 directly to the plates by means of tongues 13, and indirectly through the tongues 18 of spacing rings 16 and to the plates through the walls of grooves 19 and deflected plate tongues 12. With so large an area to transmit the torque, no part of the sheave or hub is overstressed, and a long life for the sheave and hub assembly is thereby obtained. There is no likelihood of play or backlash developing between the disks and the hub, and the major portion of the shearing stresses on the welds between adjacent disks is relieved.

Figure 6:
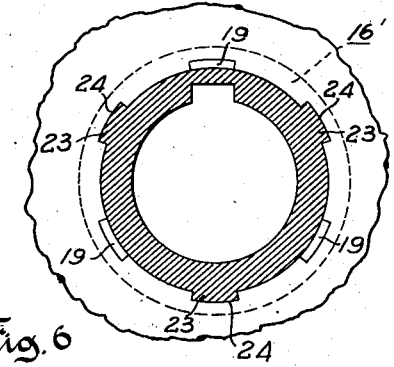
Fig. 6 is a cross-section fragmentary view of a modified construction of sheave and hub.

A modification is shown in Fig. 6, where the tongues 13 and 18 are replaced by grooves 24, provided in the disks and spacing rings 16', which cooperate with tongues 23 provided on hub 21'. The grooves and tongues of the modification of Figs. 1 to 5 are thus reversed. The remaining structure is as described above.

Various modifications within the spirit of this invention, and included in the scope of the claims appended hereto, will readily occur to those skilled in the art. For example, it is obvious that the deflected disk tongues 12 could be arranged to cooperate with grooves in the exterior surface of the rings 16, 16' rather than in the interior surface shown.

It is claimed and desired to secure by Letters Patent:

1. A sheave comprising a plurality of pressed metal plates provided with alined central apertures and tongues extending therefrom adjacent said apertures, spacing rings adjacent said apertures arranged between certain of said plates and provided with grooves alined with said tongues, said tongues being axially deflected within said grooves, whereby said plates and rings are interlocked against relative rotation.

2. A sheave as defined in claim 1, a hub within said alined apertures, and means for interlocking said hub against rotation with respect to said rings and plates.

3. A sheave as defined in claim 1, a hub within said alined apertures, and means for interlocking said hub against rotation with respect to said rings and plates, said interlocking means comprising an axially alined groove in said hub and a complementary axial tongue on said plates and rings fitting within said groove.

4. A sheave as defined in claim 1, a hub within said alined apertures, and means for interlocking said hub against rotation with respect to said rings and plates comprising an axial groove in said rings and plates and a complementary axial tongue on said hub snugly fitting into said groove.

5. A sheave comprising at least two plates provided with axially deflected abutting conical peripheral surfaces and central apertures, each of said plates having at least two tongues extending therefrom adjacent said apertures, a spacing ring provided with at least one tongue and at least one groove located between said disks at their inner perimeters, one tongue of each plate being axially alined with said ring tongue and one tongue of each plate being axially alined with said ring groove and axially deflected therein to interlock said ring and said plates.

6. A sheave comprising at least one plate provided with a central aperture and having at least two tongues extending therefrom adjacent said central aperture, a spacing ring provided with at least one tongue and at least one groove located adjacent said disk, the inner perimeter of said disk substantially coinciding with the inner perimeter of said ring, one tongue of said plate being axially alined with said ring tongue and one tongue of said plate being axially alined with said ring groove and axially deflected therein to interlock said ring and said plate.

7. A pressed metal sheave comprising a plurality of sheet metal plates provided with deflected conical surfaces and arranged alternately face to face and back to back, said plates being provided with alined central hub-receiving apertures, each plate being provided with a plurality of tongues extending therefrom adjacent said apertures, and spacing rings between alternate plates adjacent said apertures, said spacing rings being provided with alternate axial tongues and grooves.

8. A sheave as defined in claim 7, certain of said plate tongues being alined with said spacing ring tongues and other of said plate tongues being alined with said spacing ring grooves and deflected into said grooves, whereby said plates are interlocked with said spacing rings and said collection of plates and rings presents axial ribs extending along the inner bore thereof.

9. A sheave as defined in claim 7, and a hub removably located within the bore formed by said alined apertures and rings, said hub being provided with grooves which receive certain of said alined axial tongues of said plates and rings.

10. A sheave comprising a plurality of pressed metal plates provided with alined central apertures and a plurality of tongues extending therefrom adjacent said aperture from each plate and alined with the tongues of the remaining plates, spacing rings between adjacent pairs of plates adjacent said apertures, said spacing rings being provided with alternating grooves and tongues at their inner perimeters, alternate ones of said plate tongues being axially alined with said spacing ring tongues, and the remaining plate tongues being alined with said spacing ring grooves and deflected axially into said grooves, whereby said rings and plates are interlocked against relative rotation.

11. A sheave comprising a collection of pressed metal plates provided with deflected conical peripheral surfaces and arranged alternately face to face and back to back, said plates being provided with alined central apertures and axially alined tongues on said plates, certain of said tongues extending radially into said apertures; a plurality of spacing rings arranged between abutting pairs of plates adjacent said central apertures, said spacing rings being provided with alined axial grooves and tongues alined with said plate tongues, those of said plate tongues alined with said ring grooves being axially deflected within said grooves; and a hub located within said alined apertures and provided with grooves occupied by said alined spacing ring and said radial plate tongues.

12. As an article of manufacture, a sheave spacing ring provided on its inner perimeter with alternate axial tongues and grooves.

13. A sheave comprising a plurality of disks provided with axially alined hub-receiving openings, spacing rings provided with similar hub-receiving openings interposed between certain of said disks, axial grooves provided in said spacing rings, and axially deflected tongues from said disks fitting within said grooves to interlock said disks and rings.

EDWARD H. SCHULTZ, Jr.